United States Patent [19]

Hobbs

[11] 4,402,758

[45] Sep. 6, 1983

[54] METHOD FOR REMOVING SCALE FROM POROUS DIFFUSION TILES

[75] Inventor: Millice F. Hobbs, Monte Sereno, Calif.

[73] Assignee: Sterling Drug Inc., New York, N.Y.

[21] Appl. No.: 348,681

[22] Filed: Feb. 16, 1982

Related U.S. Application Data

[63] Continuation-in-part of Ser. No. 186,085, Sep. 11, 1980, abandoned.

[30] Foreign Application Priority Data

Sep. 7, 1981 [EP] European Pat. Off. .......... 1107032.5

[51] Int. Cl.³ .............................................. B08B 5/00
[52] U.S. Cl. ......................................... 134/3; 134/21; 134/22.1; 134/28; 134/30
[58] Field of Search ...................... 134/3, 21, 22.1, 28, 134/30, 37; 210/754; 261/87, 122

[56] References Cited

U.S. PATENT DOCUMENTS

| | | | |
|---|---|---|---|
| 2,684,330 | 7/1954 | French | 134/30 X |
| 2,686,138 | 8/1954 | Klein | 134/122 X |
| 3,522,093 | 7/1970 | Woolman | 134/21 X |
| 3,881,872 | 5/1975 | Naono | 134/21 X |

OTHER PUBLICATIONS

Franklin, *Water Works & Sewerage*, "Purging Diffuser Plates with Chlorine", 6/1939, pp. 232–233.
Jackson, *Water Works & Sewerage*, "Maintaining Open Diffuser Plates with Chlorine", 9/1942, pp. 380–382.

*Primary Examiner*—Robert L. Lindsay, Jr.
*Attorney, Agent, or Firm*—Allen H. Erickson; Thomas L. Johnson; B. Woodrow Wyatt

[57] ABSTRACT

A method for cleaning porous diffusion tiles used in systems for distributing oxygen or oxygen containing gas in water bodies is disclosed. The build-up of scale, which blocks the pores in such diffusion tiles, is removed by (1) purging the oxygen distribution system with a nonoxidizing gas such as nitrogen, (2) injecting substantially pure HCl gas through the system which removes the scale, and (3) purging the system again with the nonoxidizing gas before resuming flow of oxygen or oxygen containing gas. The use of a nonoxidizing purge gas before and after acid treatment prevents severe corrosion in the oxygen distribution system caused by the simultaneous presence of HCl gas and oxygen.

7 Claims, 3 Drawing Figures

METHOD FOR REMOVING SCALE FROM POROUS DIFFUSION TILES

BACKGROUND OF THE INVENTION

1. Field of the Invention

This is a continuation-in-part of patent application Ser. No. 186,085, filed Sept. 11, 1980 now abandoned.

The present invention relates generally to a method for cleaning diffusion tiles of a gas distribution system. Such systems are used for aeration, ozonation, and oxygenation treatment of water and wastewater, for flotation of various materials, and for other facilities requiring diffusion of gas streams into liquids.

2. Description of the Prior Art

The use of pure oxygen in the aeration tanks of a wastewater treatment facility is advantageous because the treatment capacity of a given-sized tank can be greatly increased over the capacity when using air. Depending upon the activated-sludge process being utilized, treatment capacities when using oxygen can be increased anywhere from two to six-fold over the comparable figure when using air. The drawback long associated with the use of oxygen in such facilities was the necessity of using covered tanks in order to recycle oxygen escaping from the surface. This drawback has been overcome by the use of very fine oxygen bubbles which increase the mass transfer rate of oxygen to the liquid to such an extent that 90 percent of the oxygen fed to the tank will be transferred to the liquid with only a single pass through the mixed liquor in uncovered tanks.

The oxygen diffusion system which produces such fine bubbles requires the use of diffusion tiles mounted on rotating diffuser discs. Oxygen is fed through an intricate network of pores in the tiles and small bubbles form on the surfaces thereof. Each disc, having an impeller at the center thereof, is rotating, causing the water to flow outward along the surface of the disc. The diffusion tiles are located along the annular perimeter of the disc and the hydraulic shearing action of the water disperses the bubbles before they become large.

With normal gas diffusion equipment, a gas bubble develops and increases in size until its buoyant force exceeds the surface tension holding it to the forming medium. Under these conditions, the gas bubbles are relatively large, providing a lower surface area to volume ratio. Such a low surface area ratio does not favor high mass transfer rates. By introducing a constant flow past the diffusion tiles, the hydraulic shear dislodges the bubbles from the tile prior to large bubble development. Surface tension is broken by the shearing force, producing bubbles in the micron range. Such a pure oxygen diffusion system is described in U.S. Pat. No. 3,992,491 to Ihrig et al.

The diffusion tiles are typically formed of compressed aluminum silicates, a sintered metal, a sintered plastic, or micropore stainless steel screen, or the like. Each tile contains a very large number of small pores through which the oxygen diffuses.

The same type of diffusion system may be utilized to treat water in a reservoir or natural water body, such as a river or lake. Depending on the economics of the particular installation, pure oxygen or an oxygen containing gas such as air or enriched air is used.

Porous diffusion tiles on rotating discs are also useful for diffusing very small bubbles of air into slurries of ores and minerals or into wastewater sludges, to produce flotation and concentration of the suspended solids.

A problem with all types of diffuser tiles has been scale formation on the surface of the tiles exposed to the water. The scale partially blocks the pores and requires that the oxygen or oxygen containing gas be pumped at higher pressures to maintain an adequate flow. The higher pressures, of course, cause increased operating costs for the system.

When oxygen, air or ozone is diffused into water bodies, scale may form in the pores of the diffuser tiles. The chemical composition of the scale depends upon the ion species present in the water. In many cases the scale is composed of ferric hydroxide, manganese hydroxide or other metal oxides and/or hydroxides. In some cases the scale may be comprised of calcium carbonate or other insoluble alkaline earth compounds.

Prior to the present invention, scale was removed from the diffusion tiles by first removing the rotating disc from the water in the treatment tank and second either scrubbing the tiles with wire brushes or sandblasting the tiles. Both methods of cleaning are costly and require that the treatment tank be shut down for a period of several hours, at least.

It has also been found that the deposition of scale can be prevented by applying an electrical potential to the tiles which prevents the oxidation reaction which leads to the scale. To apply such a potential, however, requires that the ceramic diffusion tiles and the sintered plastic tiles be plated with a metallic conductor. Such plating is costly and undesirable for that reason.

SUMMARY OF THE INVENTION

The present invention provides for the removing of scale from diffusion tiles used in a gas distribution system for diffusing oxygen or oxygen containing gas, including ozone, to a water body. During the cleaning process the tiles may remain submersed in the water body, or alternately may be removed from the water body. Such scale removal is accomplished by injecting substantially pure HCl gas into the gas distribution system so that the gas diffuses through the pores of the diffusion tile and reacts chemically with the scale which has previously formed. Before injecting the HCl gas into the system, it is necessary to purge the system with a nonoxidizing gas, such as nitrogen, in order to remove substantially all oxygen and water from said system. The purge is necessary to prevent severe corrosion conditions which can result from the simultaneous presence of oxygen, HCl gas and water.

The system must also be purged subsequent to HCl treatment and prior to reintroducing oxygen or oxygen containing gas in order to prevent the occurrence of such corrosive conditions.

Due to the particular chemistry associated with the aluminum silicate and sintered plastic diffusion tiles in a typical environment, very short treatment periods, typically ten minutes, are required to completely clean the tiles and restore gas flow in the system to its initial condition.

Scales including those formed of metal and alkaline earth metal oxides, hydroxides and carbonates are removed by this process.

In this process, scale is removed from porous diffusion tiles which are part of a system for distributing a flow of fine bubbles of oxygen or an oxygen-containing gas to a water body. The method comprises:

stopping the flow of said gas to said tiles, and injecting a nonoxidizing gas into said distribution system in order to purge substantially all oxygen from said system, injecting substantially pure HCl gas to the tiles so that said HCl gas infiltrates the pores of the diffusion tiles and reacts with the scale, thereby dissolving said scale, and injecting a non-oxidizing gas into said distribution system whereby substantially all HCl gas is purged from said system prior to resuming the flow of said oxygen or oxygen containing gas therethrough.

DESCRIPTION OF THE PREFERRED EMBODIMENT

Figure 1:
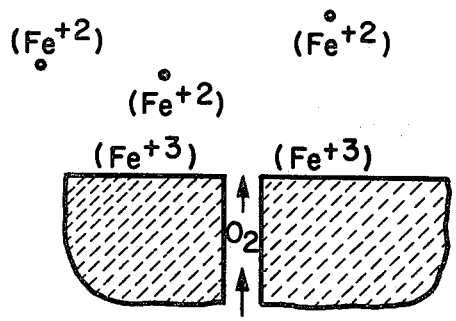
FIG. 1 is a schematic illustration of a single pore on a diffusion tile illustrating the chemical environment thereabout.

Referring to FIG. 1, ferrous ions ($Fe^{+2}$) are typically present in waters and wastewaters which are treated by an oxygen distribution system, such as that described by Ihrig et al in U.S. Pat. No. 3,992,491. In the presence of oxygen, and particularly in the region where oxygen escapes from the pores in the ceramic diffusion tiles, the $Fe^{+2}$ ion is oxidized to the ferric ion ($Fe^{+3}$) according to the following equation:

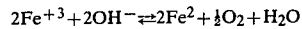

The porous diffusion tile may be formed of aluminum silicate with the formula $(Al_2O_3)_x(SiO_2)_y$, where $y \gg x$. Since the silicate ion ($SiO_2^-$) has a net negative charge, the ceramic surface also has a net negative charge. The ceramic surface, therefore, attracts the $Fe^{+2}$ ion forming a reactive complex with the $Fe^{+2}$ ion bonded to the ceramic surface. The bonded $Fe^{+2}$ ion is subsequently oxidized to the $Fe^{+3}$ ion by the oxygen emerging from the pores. Said reactive complex then reacts in the presence of the hydroxyl ion ($OH^-$) to form ferric hydroxide with the formula $Fe(OH)_3$.

A similar phenomenon occurs with tiles formed of sintered plastic material. The surface of such tiles displays a net negative charge which attracts the $Fe^{+2}$ ion. The formation of $Fe(OH)_3$ proceeds in the same manner.

Figure 2:
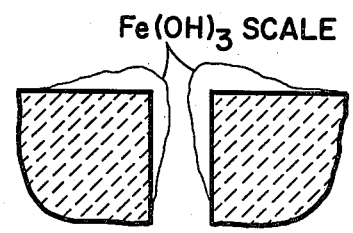
FIG. 2 is similar to FIG. 1 except that the pore is shown as it would appear after scale has formed.

The ferric hydroxide forms a hard scale near the entrance of the pore where the oxygen concentration is the greatest. Such a scale, which partially blocks the pore, is illustrated in FIG. 2. The scale deposit increases with time, eventually requiring high pump pressure to maintain the required flow of oxygen or oxygen containing gas to the water. Scale deposition occurs, though more slowly, even when the oxygen concentration in the gas is relatively low, such as in air.

It has been found that treatment of the ferric hydroxide with any of several acid gases forms a soluble salt which eventually goes into solution. For example, treatment with $SO_2$ gas forms ferric sulphite $Fe_2(SO_3)_3$ and ferric sulphate $Fe_2(SO_4)_3$. Treatment with nitrogen oxide $NO_2$ forms $Fe(NO_3)_2$ which rapidly goes into solution. Both these gases, however, are undesirable as cleaning agents for the diffusion tiles. The salt formed by the $SO_2$ gas requires an excessive amount of time to go into solution, while $NO_2$ gas presents an extreme hazard to operating personnel.

A third acid gas, HCl gas, has been found to be suitable in all respects for removing the ferric hydroxide scale. First, the gas is reasonably safe to handle when personnel are taught elementary safety precautions. Second, the complex salt formed by treatment with HCl gas is highly soluble and goes into solution in a very short time. Third, the gas is relatively inexpensive.

Treatment of the ferric hydroxide scale with HCl gas produces a complex iron tetrachloride ion ($FeCl_4^-$) according to the following reaction:

Formation of the iron tetrachloride ion is reasonably rapid and the ion goes into solution immediately after formation. Treatment times in the range from 10 to 20 minutes have been found adequate to remove virtually all scale from the diffusion tiles.

In the same way, HCl gas forms soluble chloride salts with metal and alkaline earth metal scales to rapidly remove the scales from the porous tile surfaces.

Hydrogen chloride gas in the presence of oxygen and water forms a highly corrosive mixture which attacks the stainless steel tubing used in the oxygen distribution system of water treatment installations. For this reason, it is necessary that all oxygen be removed removed from the distribution system prior to introduction of HCl gas. The system is purged with a nonoxidizing gas, typically nitrogen gas, prior to introduction of HCl gas. The system is again purged after the acid gas treatment has been completed and before oxygen or oxygen containing gas is reintroduced to the system. In this way, significant concentrations of oxygen are never present at the same time as the HCl gas, and severe corrosion conditions are avoided.

Figure 3:
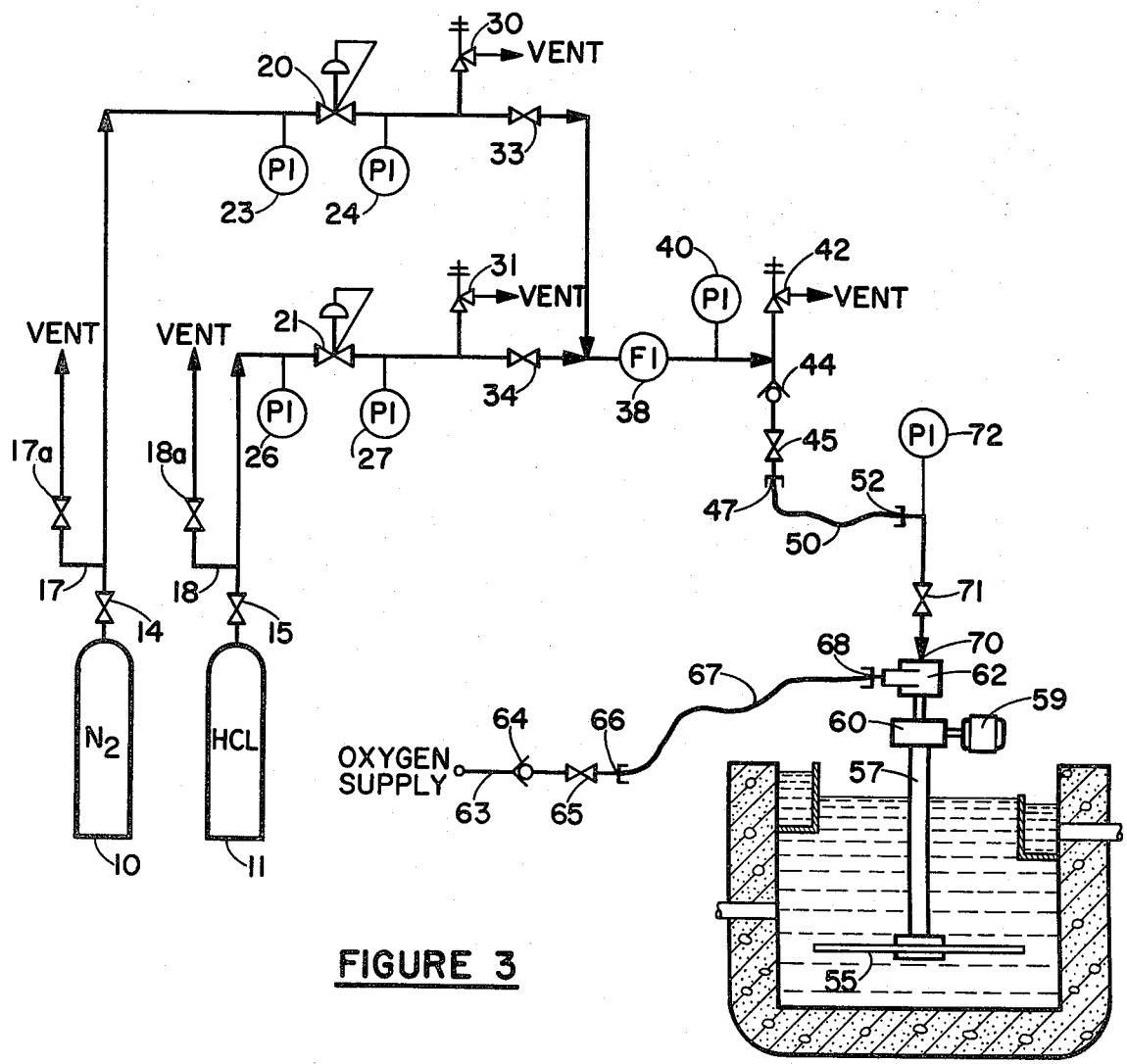
FIG. 3 is a schematic diagram of a gas transfer system and equipment useful to practice the present invention.

Exemplary equipment required to carry out the present invention is illustrated in the diagram of FIG. 3. Gas cylinders 10, 11 serve as the source of nitrogen and HCl gas, respectively. The nitrogen cylinder 10 is connected directly to a block valve 14 which is kept closed when the system is not in use. Immediately downstream of block valve 14 is a vent line 17 having vent valve 17a which is kept closed at all times except when it is desired to vent the system downstream of block valve 14. A pressure reducing valve 20 reduces the line pressure from the cylinder pressure to approximately 20 psig. The pressure will be varied to provide the desired flow rate of nitrogen as will be described hereinafter. Pressure gauges 23, 24 are located immediately upstream and immediately downstream of the pressure valve 20 in order to monitor its performance. An emergency relief valve 30, located downstream of pressure reducing valve 20, is set at 35 psig and protects the system against over pressure due to failure of the pressure reducing valve. A second nitrogen block valve 33 is located downstream of the relief valve 30 but upstream of the junction between the nitrogen line and HCl line.

The piping of the HCl cylinder is identical to that of the nitrogen cylinder prior to the junction of the two lines. A block valve 15 is used to shut off the HCl cylinder when not in use. A vent line 18, which includes a vent valve 18a, is located immediately downstream of the block valve and upstream of a pressure reducing valve 21. Pressure gauges 26, 27 are located upstream and downstream of the pressure reducing valve 21, respectively. A pressure relief valve 31 is located downstream of the pressure reducing valve 21, and an HCl block valve 34 allows isolation of the HCl gas from the common piping downstream.

The common piping downstream of the junction between the nitrogen piping and the HCl piping provides for flow measurement of the nitrogen gas, the HCl gas, or the combined stream of both nitrogen and HCl into a rotating diffuser disc 55. A flow indicator 38 is located immediately downstream from the point where the nitrogen line and the HCl line merge. The flow indicator 38 will typically be an in-line rotameter suitably shielded for acid gas service. A pressure gauge 40 is mounted immediately downstream of the flow indicator 38 together with an additional pressure relief valve 42 set at 35 psig. A check valve 44 prevents back flow of oxygen into the cleaning apparatus. A block valve 45 is located downstream of the pressure relief valve 42 and immediately upstream of a hose connection 47.

The equipment described so far, including both gas cylinders 10 and 11, will normally be mounted on a movable chassis of some sort. A flexible hose 50 connects at one end to the hose connection 47 and at the other end to a second hose connection 52 permanently affixed to the rotating disc system. In this way, the cleaning equipment can be moved to the various rotating diffuser discs which comprise the oxygen distribution system whenever cleaning is required.

The rotating diffuser disc system comprises the disc 55 having a plurality of the porous tiles mounted on the annular perimeter thereof. The disc 55 is mounted on the distal end of a hollow drive shaft 57 adapted to feed oxygen to the disc assembly 55. A motor 59 rotates the drive shaft 57 through a gear reduction box 60. A rotating seal assembly 62 is mounted atop the gear reduction box 60 and attached to the drive shaft 57 so that oxygen may be constantly fed to said drive shaft while it is being rotated. The seal assembly 62 acts as a transition from the stationary upstream piping and the rotating drive shaft 57.

An oxygen supply line 63 having a block valve 65 and a check valve 64 terminates in a hose connection 66. A flexible hose 67 connects at one end to the hose connection 66 and at the other end to a second hose connector 68 on the rotating seal 62, thereby connecting the oxygen supply to the rotating diffuser disc.

A second part 70 on the rotating seal assembly 62 is used as the cleaning connection. A block valve 71 is mounted directly on the port 70 and used to isolate the cleaning system from the rotating diffuser system. The hose connector 52 is mounted immediately upstream of the block valve 71 together with a pressure indicator 72.

Cleaning of the porous discs is accomplished as follows.

The cleaning equipment is positioned close to the rotating disc system so that the flexible hose 50 may be connected between connectors 47 and 52. Block valves 14, 15, 33, 34 and 45 should all be shut tightly at this stage. The operator should wear a portable respirator and all other personnel should remain upwind of the cleaning operation for safety.

Block valve 71 should then be opened and the pressure indicated on pressure gauge 72 should be noted. The pressure observed is equal to the back pressure of oxygen upstream of the diffusion tiles and is indicative of the degree of blockage on the tile pores. If the pressure indicated by pressure gauge 72 exceeds 20 psig, the pressure should be reduced to 20 psig by slowly closing oxygen block valve 65. Next, nitrogen block valve 14 should be opened and pressure gauge 23 should indicate a pressure above 30 psig. If the pressure is below this level, the nitrogen cylinder 10 should be replaced. Next, the user should open the block valve 33, allowing pressure gauge 40 to register a static pressure approximately equal to that observed on pressure gauge 23. The user next opens the final block valve 45, and immediately thereafter closes the oxygen block valve 65, the aggregate flow rate of oxygen and the nonoxidizing gas being held substantially constant until the flow of oxygen has been stopped entirely.

Nitrogen gas is now flowing in the rotating diffuser disc 55, purging the oxygen in the shaft 57 and diffuser assemblies. The nitrogen flow is adjusted to a preselected volumetric rate (based on the particular tiles being cleaned) by adjusting the setting of pressure reducing valve 20. Once the proper flow rate is attained, the purge should be continued for at least 3 minutes, and the readings on the flow indicator 38 and pressure gauge 40 or 72 should be noted.

At this point, the operator should warn all personnel in the immediate area that HCl gas is about to be used. All personnel should stand upwind and clear of the mobile cleaning equipment. The operator should then don the respirator mask and wear the mask during the remainder of the cleaning procedure.

The HCl gas is introduced to the rotating diffuser disc while continuing the nitrogen purge. First, block valve 15 is opened and the HCl cylinder pressure indicated by pressure gauge 26 checked. If the pressure is adequate, the pressure reducing valve 21 is slowly opened until the downstream pressure gauge 27 indicates that the flow passage has opened. The user then slowly opens block valve 34 while simultaneously closing block valve 33. To the extent possible, the user should maintain a constant total flow of both nitrogen and HCl gas through the flow meter 38. Once valve 34 is fully opened and valve 33 is fully closed, pure HCl gas will be fed to the diffuser disc assembly. The user should then adjust the flow through flow meter 38 to a preselected value which depends on the system characteristics. For most systems now installed the flow rate will be 6 scfm. The flow rate through meter 38 should increase as the system is cleaned. As the flow increases, the user should reduce the HCl pressure by turning down pressure reducing valve 21, maintaining the desired flow rate. Typically, it will take several minutes for the HCl gas to purge the nitrogen from the system before cleaning fully commences. After purging, the HCl gas should be run until the system pressure indicates that the di-fusion tiles have been cleaned. Typically, this will take from two to five minutes. The total amount of time that HCl gas must be fed to the system is normally from five to ten minutes.

Once the cleaning has been acomplished, the user should slowly open the nitrogen block valve 33 while simultaneously closing the HCl block valve 34, the aggregate flow rate of HCl gas and the nonoxidizing gas being held substantially constant until the flow of HCl gas has been stopped entirely. Adjustment should be made, as necessary, to pressure reducing valve 20 to maintain the desired flow rate. The HCl block valve 15 should also be closed. Nitrogen gas is now flowing to the rotating diffuser disc, purging the HCl gas from the system. At this point the nitrogen flow should be increased to the design flow rate (typically 12 scfm), by adjusting pressure reducing valve 20. The purge should be continued until the system has been adequately purged of HCl gas, typically requiring three minutes. The rotating diffuser disc is returned to normal operation by opening oxygen block valve 65 and closing the nitrogen block valve 33, the aggregate flow rate of the nonoxidizing gas and oxygen being held substantially constant until the flow of nonoxidizing gas has been stopped entirely. Block valve 71 is then closed and flexible hose 50 may be disconnected from the hose connection 52. Prior to removing the cleaning apparatus from the area, the user should insure that all block valves in the system are shut.

The scale removal method of this invention is applicable not only to porous diffusion tiles mounted on rotating discs, but to any porous tile used for oxygen diffusion into water, whether part of an active or static gas transfer system. This method is thus useful for example to clean diffuser plates and tubes commonly used in activated sludge aeration tanks.

While this embodiment is shown in application for removing scale from diffusers in a wastewater treatment tank such as an activated sludge tank, this invention is equally applicable to similar porous diffusers installed in natural water bodies, tanks for flotation of ores, minerals or wastewater solids and other similar water bodies.

Although the best mode contemplated for carrying out the present invention has been herein shown and described, it will be apparent that modification and variation may be made without departing from what is regarded to be the subject matter of this invention.

What is claimed is:

1. A method for removing scale from porous diffusion tiles, said tiles being part of a system for distributing a flow of fine bubbles of oxygen or an oxygen-containing gas to a water body, said method comprising the following steps:
    stopping the flow of said gas to said tiles, and injecting a nonoxidizing gas into said distribution system in order to purge substantially all oxygen from said system,
    injecting substantially pure HCl gas to the tiles so that said HCl gas infiltrates the pores of the diffusion tiles and reacts with the scale, thereby dissolving said scale, and
    injecting a nonoxidizing gas into said distribution system whereby substantially all HCl gas is purged from said system prior to resuming the flow of said oxygen or oxygen-containing gas therethrough.

2. A method for removing scale from porous diffusion tiles, said tiles being part of a system for distributing a flow of oxygen or oxygen containing gas to a water body, said method comprising the following steps:
    stopping the flow of said oxygen or oxygen containing gas to the oxygen distribution system, and injecting a nonoxidizing gas to the oxygen distribution system in order to purge substantially all oxygen from said system,
    injecting substantially pure HCl gas to the oxygen distribution system so that said HCl gas infiltrates the pores of the diffusion tiles and reacts with the scale, thereby dissolving said scale, and
    injecting a nonoxidizing gas to the oxygen distribution system whereby substantially all HCl gas is purged from the oxygen distribution system prior to resuming the flow of oxygen therethrough.

3. A method for removing ferric hydroxide scale from porous diffusion tiles while said tiles remain in place in an oxygen distribution system for distributing a flow of oxygen or oxygen containing gas in a water body, said method comprising the following steps:
    stopping the flow of said oxygen or oxygen containing gas to the oxygen distribution system, and purging said oxygen distribution system with a nonoxidizing gas for a period of time necessary to remove substantially all oxygen from said system,
    injecting substantially pure HCl gas into said system for a period of at least five (5) minutes so that the scale reacts with the HCl gas to form a highly soluble complex salt which goes into solution, and
    purging said oxygen distribution system a second time with the nonoxidizing gas, after the injection of the HCl gas has been completed, in order to remove substantially all HCl gas from said system prior to reintroducing the flow of oxygen or oxygen containing gas.

4. A method for removing ferric hydroxide scale from porous diffusion tiles, said tiles being part of an oxygen distribution system for distributing a flow of oxygen or oxygen containing gas in a water body, said method comprising the following steps:
    stopping the flow of oxygen or oxygen containing gas to the oxygen distribution system, while starting a flow of a nonoxidizing gas to the oxygen distribution system simultaneously with stopping the flow of oxygen or oxygen containing gas, the aggregate flow rate of oxygen or oxygen containing gas and the nonoxidizing gas being held substantially constant until the flow of oxygen or oxygen containing gas has been stopped entirely,
    stopping the flow of the nonoxidizing gas to the oxygen distribution system after substantially all oxygen has been purged from said system, while slowly starting a flow of HCl gas to the oxygen distribution system simultaneously with stopping the flow of the nonoxidizing gas, the aggregate flow rate of the nonoxidizing gas and the HCl gas being held substantially constant until the flow of the nonoxidizing gas has been stopped entirely,
    stopping the flow of the HCl gas to the oxygen distribution system after substantially undiluted HCl gas has passed through the pores of the diffusion tiles for a period of at least two minutes, while slowly resuming the flow of the nonoxidizing gas to the oxygen distribution system simultaneously with the stopping of the flow of HCl gas, the aggregate flow of HCl gas and the nonoxidizing gas being held substantially constant until the flow of HCl gas has been stopped entirely,
    stopping the flow of the nonoxidizing gas to said system after substantially all HCl gas has been purged from said system, and
    resuming the flow of oxygen or oxygen containing gas to the oxygen distribution system simultaneously with the stopping of the flow of nonoxidizing gas, the aggregate flow of the nonoxidizing gas and oxygen or oxygen containing gas being held substantially constant until the flow of nonoxidizing gas has been stopped entirely.

5. A method according to claims 1, 2, 3, or 4, wherein the nonoxidizing gas is nitrogen gas.

6. A method according to claims 1, 2, 3, or 4, wherein the oxygen containing gas is air.

7. A method according to claim 2, 3, or 4, wherein said diffusion tiles are part of a system for distributing a flow of pure oxygen gas in a water body comprising a wastewater treatment tank.

* * * * *

UNITED STATES PATENT AND TRADEMARK OFFICE
CERTIFICATE OF CORRECTION

PATENT NO. : 4,402,758
DATED : September 6, 1983
INVENTOR(S) : Millice F. Hobbs

It is certified that error appears in the above-identified patent and that said Letters Patent are hereby corrected as shown below:

Cover page, under [30] Foreign Application Priority Data, "1107032.5" should read --81107032.5--.

Column 5, line 47, "part" should read --port--.

Column 6, line 13, "in the" should read --to the--; line 22, "warm" should read --warn--.

Signed and Sealed this

Thirteenth Day of December 1983

[SEAL]

Attest:

GERALD J. MOSSINGHOFF

Attesting Officer     Commissioner of Patents and Trademarks